US011667444B1

(12) United States Patent
da Silva

(10) Patent No.: US 11,667,444 B1
(45) Date of Patent: Jun. 6, 2023

(54) BOTTLE CAP ASSEMBLY HAVING INTEGRAL STEM FOR DISSOLVABLE MATERIAL

(71) Applicant: Jean-Pierre da Silva, Fort Lauderdale, FL (US)

(72) Inventor: Jean-Pierre da Silva, Fort Lauderdale, FL (US)

(73) Assignee: FUSION CAP INTERNATIONAL CORP., Fort Lauderdale, FL (US)

( * ) Notice: Subject to any disclaimer, the term of this patent is extended or adjusted under 35 U.S.C. 154(b) by 227 days.

(21) Appl. No.: 16/272,544

(22) Filed: Feb. 11, 2019

(51) Int. Cl.
*B65D 51/28* (2006.01)
*B65D 85/808* (2006.01)
*A47J 31/00* (2006.01)

(52) U.S. Cl.
CPC ........ *B65D 51/2807* (2013.01); *A47J 31/005* (2013.01); *B65D 85/808* (2013.01)

(58) Field of Classification Search
CPC .... B65D 51/02; B65D 85/808; B65D 85/812; B65D 85/8085; B65D 51/2807; B65D 2251/08; A47J 31/06; A47J 31/0615; A47J 31/0626; A47J 31/005
USPC ....................................................... 220/287
See application file for complete search history.

(56) References Cited

U.S. PATENT DOCUMENTS

| 5,772,017 | A | * | 6/1998 | Kang | ................. | B65D 51/2842 |
| | | | | | | 206/222 |
| 6,024,012 | A | | 2/2000 | Luzenberg, Jr. | | |
| 6,170,654 | B1 | | 1/2001 | Gartner et al. | | |
| 6,399,126 | B1 | * | 6/2002 | Weldon, Jr. | ............ | A23G 3/563 |
| | | | | | | 426/132 |
| D490,315 | S | | 5/2004 | Kiser | | |
| 7,051,648 | B2 | | 5/2006 | Fenaroli | | |
| 7,300,632 | B2 | * | 11/2007 | Sugiyama | .......... | A61B 10/0096 |
| | | | | | | 422/50 |
| 8,783,166 | B2 | | 7/2014 | Kramer | | |
| 9,795,242 | B2 | | 10/2017 | Waggoner et al. | | |
| 10,661,266 | B2 | * | 5/2020 | Kang | ................... | B01L 3/0282 |
| 2008/0087624 | A1 | | 4/2008 | Buckley | | |
| 2017/0050770 | A1 | * | 2/2017 | Vournou | ................ | B65D 41/02 |
| 2018/0296023 | A1 | | 10/2018 | Waggoner | | |

* cited by examiner

*Primary Examiner* — Anthony D Stashick
*Assistant Examiner* — Raven Collins
(74) *Attorney, Agent, or Firm* — Dale P. DiMaggio, Esq.; Malin Haley DiMaggio & Bowen, P.A.

(57) ABSTRACT

A unitary cap assembly for a conventional water bottle or container with integral components, and a cap body with a lower section that snaps, screws or twists onto the bottle neck. The cap body includes an upper section providing for fluid flow, and having an integral stem which acts as a dip stick and when attached protrudes into the bottle. The stem is secured to the upper cap body with "fingers" or radial arms to create voids that liquid passes through for drinking. A dissolvable substance or composition is formed and attached to the stem. The stem suspends the substance in the liquid. The soluble substances can be shaped as pellets, capsules, rectangles or others that are desired and dimensioned for insertion through the bottle neck.

17 Claims, 5 Drawing Sheets

BOTTLE CAP ASSEMBLY HAVING INTEGRAL STEM FOR DISSOLVABLE MATERIAL

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise expressly reserves all rights whatsoever.

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

1. Field of the Invention

The present invention generally relates to bottle or container caps, and more particularly to a bottle cap assembly that introduces or suspends a dissolvable material within a bottle and liquid therein, to modify the properties of the liquid, for example to flavor a drink.

2. Description of Related Art

The prior art as it relates to bottle or container caps, discloses numerous distinct devices for introducing substances and materials into or for liquid containers, for mixing, additives, flavoring, and the like. For example, U.S. Pat. No. 9,795,242 relates to a compact filtering and additive delivery system which is adaptable for use with a portable container, such as a sports bottle, and receives a modular additive container for the metered delivery of the additive, such as a flavor concentrate, to a stream of base liquid as the base liquid is drawn or dispensed from the container.

U.S. Pat. No. 7,051,648 describes a device for making a beverage, such as tea, in a container, which is a standard two liter bottle. The device has a bag for holding a beverage component, and a securing device for securing the bag with the container. The device also has either a planar element for holding or suspending the device in the container, a shaft or suspending member for submerging the bag, and/or a supplemental attachment device for attaching a bag to a supplemental bag in series, or a rigid frame where the bag is disposed inside the rigid frame.

U.S. Pat. No. 6,854,595 illustrates a container closure containing a mix to be attached to a liquid container around a container opening. The container closure includes a storage compartment which includes a mix, such as powder or concentrated liquid. The storage compartment includes a seal or a rotating member to seal the mix within the storage compartment. A plunger unseals the seal or the rotating member is rotated to allow the mix to be mixed with the liquid in a liquid container to flavor the liquid when the container closure is attached to the liquid container.

U.S. Pat. No. 6,170,654 relates to a closure cap housing a rupturable blister pack in which an additive, that may be a tablet for mix, is retained to be released into the liquid contents of a bottle simultaneously upon opening of the closure cap and the rupturing of the blister pack by part of a closure member such as a shaft, pillar or protrusion and forming part of the closure cap, causing the contents of the container to be dispensed either through the closure cap or after removal of the closure cap.

The prior art provides alternative devices, systems, and designs for introducing or filtering substances to liquid containers, for mixing, additives, or flavoring. However, none provide a bottle cap assembly as a unitary device, having integral components for suspending a dissolvable material, providing for unimpeded fluid flow, accommodating bottle necks of varying size and dimensions, and providing complementary features incorporating superior engineering designs as does the instant invention. Consequently, there is a need for an improved bottle cap assembly incorporating these features.

It is, therefore, to the effective resolution of the aforementioned problems and shortcomings of the prior art that the present invention is directed. In view of the cap enclosures in existence at the time of the present invention, it was not obvious to those persons of ordinary skill in the pertinent art as to how the identified needs could be fulfilled in an advantageous manner.

SUMMARY OF THE INVENTION

The present invention concerns an injection molded bottle cap assembly configured to retain dissolvable materials to treat or change the property of a liquid in a bottle, such as water or others. The dissolvable materials or substances include vitamins, nutritional supplements, liquid flavorings, additives for treatment or maintenance, or any similar compositions.

The cap assembly is a unitary device that has a detachable top for removal to drink liquid from the bottle, such as a conventional sports or water bottle. The assembly has integral components, and a cap body with a lower section acting as a base that snaps, screws or twists onto the bottle neck. The cap body includes an upper section providing for fluid flow, and having an integral stem which acts as a dip stick and when attached, and protrudes into the bottle. The stem is secured to the upper cap body with "fingers" or radial arm members to create voids, such that liquid can pass through the cap for drinking. The dissolvable substance or composition in one embodiment is formed in a cylindrical shape, and the stem is inserted within the cylinder. The stem suspends the substance in the liquid, and can be made of a plastic composite, flexible, or other material. The soluble substances can be shaped as pellets, capsules, rectangles or others that are desired and dimensioned for insertion through the bottle neck. Any means can be used to retain the substance about the stem to insert both into the water or liquid, such as a friction fit, threads, prongs, or spring fingers located at the stem's end.

Accordingly, it is an object of the present invention to provide an improved bottle cap assembly having an integral stem for dissolvable material.

It is another object of the present invention to provide an improved bottle cap assembly having an integral stem for dissolvable material which is a unitary device having unimpeded fluid flow while being structurally superior to prior devices.

It is another object of the present invention to provide an improved bottle cap assembly having an integral stem for dissolvable material which accommodates bottle necks of various sizes.

It is another object of the present invention to provide an improved bottle cap assembly having an integral stem for dissolvable material having enhanced design features and components, is cost effective and operationally efficient.

It finally an object of the present invention to provide an improved bottle cap assembly having an integral stem for dissolvable material having all the above mentioned features and objects.

In accordance with these and other objects which will become apparent hereinafter, the instant invention will now be described with particular reference to the accompanying drawings.

DETAILED DESCRIPTION

The present invention may be understood more readily by reference to the following detailed description taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only, and is not intended to be limiting of the claimed invention.

Also, as used in the specification including the appended claims, the singular forms "a," "an," and "the" include the plural, and reference to a particular structural or functional relationship or numerical value includes at least that particular relationship or value amongst others, unless the context clearly dictates otherwise.

Figures 1, 2:
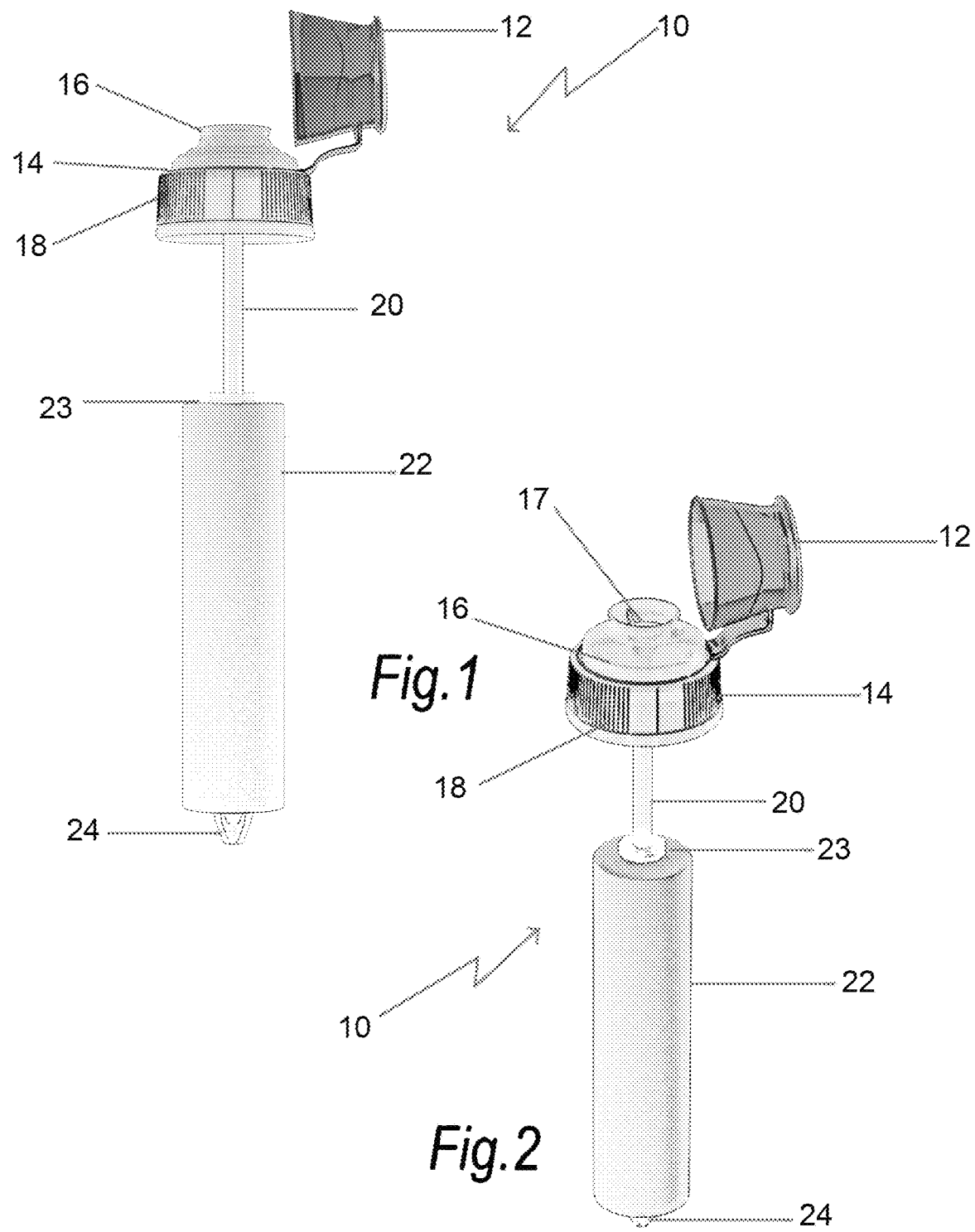
FIG. 1 is a side plan view of the improved bottle cap assembly having an integral stem for dissolvable material of the present invention.
FIG. 2 is a perspective view of the apparatus shown in FIG. 1.

With reference to FIG. 1, a side plan view of the improved bottle cap assembly 10 is shown. The cap assembly is designed to be attached to a bottle or container, and has a section which is secured to the bottle neck by a snap fit, threads or friction fit as further described hereinafter. The cap assembly includes an integral stem 20 which is inserted and protrudes into the bottle and suspends a soluble material or substance 22 into a liquid within the bottle. Bottle cap assembly 10 includes top 12, cap body 14, and the integral stem 20. Top 12 is removably attached to cap body 14, and provides a liquid seal once the cap assembly 10 is placed upon and attached to a bottle, and is shown in the open position for drinking. Stem 20 includes a retaining flange, washer or grommet 23, which functions to secure substance 22 in position, and prevent the substance from rising up or floating toward cap body 14 once it's placed in the liquid, to avoid impeding, obstructing or clogging the fluid flow as a person would drink the liquid from the bottle. Stem 20 includes a second retaining means 24, which retains substance 22 in position about stem 20 at its lowermost point. The retaining means 24 can be spring fingers, prongs, threads, an enlarged stem end, or the like, which would prevent substance 22 from sliding off, or being removed from, stem 20.

Cap body 14 includes integral upper body section 16 and lower body section 18, each having discrete components and functions which are described further in detail hereinafter.

FIG. 2 is a perspective side view of the bottle cap assembly 10 shown in FIG. 1. Upper body section 16 includes collar or neck 17 for drinking liquid from the bottle.

Figure 3:
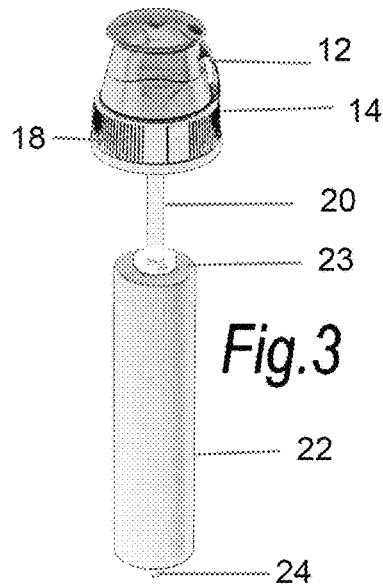
FIG. 3 is a perspective view of the apparatus shown in FIG. 2 with the top attached in the closed position.

FIG. 3 is a perspective view of the bottle cap assembly 10 shown in FIG. 2, with top 12 attached to cap body 14 in the closed position.

Figure 4:
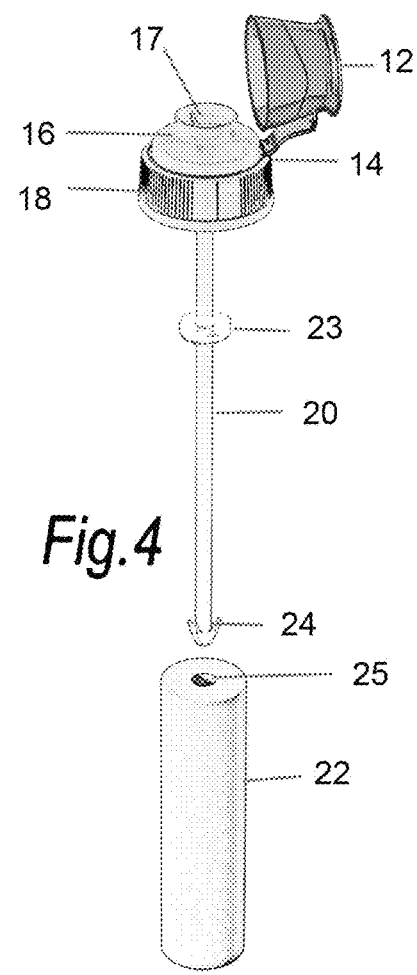
FIG. 4 is a perspective exploded view of the apparatus shown in FIG. 2.

FIG. 4 is a perspective exploded view of the bottle cap assembly 10 shown in FIG. 2, with top 12 attached to cap body 14 in the opened position. The components of the device are illustrated prior to the soluble substance 22 being attached to, and retained upon, stem 20. In this embodiment, substance 22 is formed in a cylindrical shape as shown, with a central axial bore or hole 25. Substance 22 is attached to cap assembly 10 by passing stem 20 through axial bore 25, and is positioned about stem 20 by grommet 23 and retaining means 24.

It will be appreciated by one of ordinary skill in the art that material or substance 22 can be formed in any desired shape that is dimensioned to fit into a conventional bottle or container, and pass through the neck. These include cylindrical, rectangular, oval, triangular or any other geometrical shape applicable. These can be referred to as in the form of pellets, capsules or otherwise. Substance 22 can also be frozen to cool the liquid within the bottle or container.

The soluble product or substance 22 can be any of those desired for a particular or desired affect or result, and for dispersion in the liquid. For example, the substance can be for flavoring or coloring the liquid, providing nutrients, vitamins or supplements, providing minerals or medicine, or altering or changing the properties of the water or liquid.

Substances that could be utilized with the cap assembly also include those containing alcohol, for example to mix a rum and coke beverage, hemp or CBD products and applications, to prepare cool aid, to create fizz, nitrogen additives, frozen products, popsicles, or virtually any others with application for water or liquids. Finally, the substances include those adding light features such as phosphorescence, active ingredients for glowing in the dark, or visual stimulants as well. Stem 20 can be made of a "glow in the dark" material as well, and revealed only when substance 22 has been dissolved or partially so, for added visually effect.

Material 22 could also be an enclosing material which contains soluble substances as well, the material which would either be soluble itself or provide for the separate substance to be dispersed in the liquid.

Figure 5:
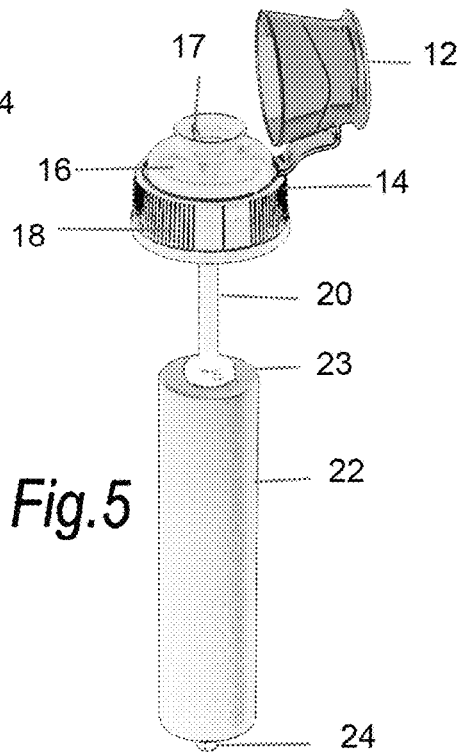
FIG. 5 is a perspective view of the apparatus shown in FIG. 3 with the top detached in the opened position.

FIG. 5 is a perspective view of the cap assembly 10 shown in FIG. 3 with top 12 detached in the opened position.

Figure 6:
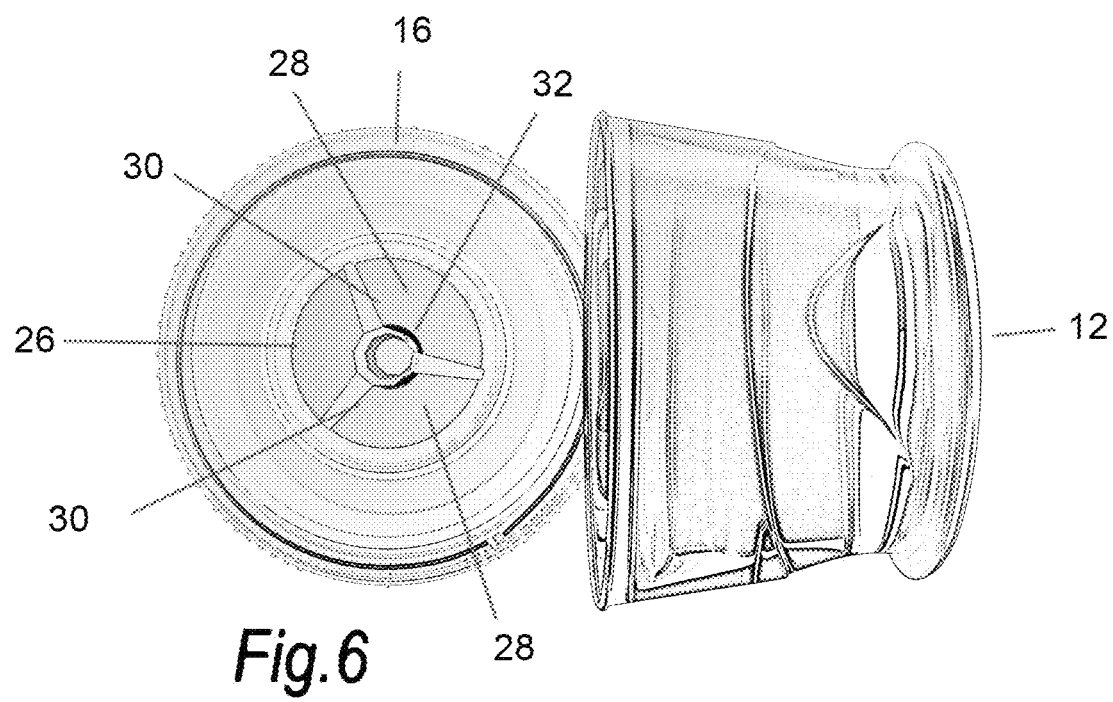
FIG. 6 is a top plan view of the top and cap body in the opened position of the present invention.

FIG. 6 is a top plan view of top 12 and cap body 14 in the opened position. Upper body section 16 includes a central ring 26 which defines an open area and voids 28 that provide for fluid flow through upper body section 16 for drinking the bottle liquid. Radial arms or members 30 are secured to central ring 26, and either the stem 30 itself, or alternatively a central hub 32 which receives, is secured to, and supports stem 20.

Both the upper body section 16 and lower body section 18 can be manufactured from a variety of materials, including plastics, rubber, composites and combinations thereof, and can be rigid, flexible, semi-flexible, resilient, or have other desired characteristics. In a preferred embodiment, upper body section 16 is generally rigid, and lower body section 18 is flexible and resilient to accommodate bottle and container necks of varying size. As such, the lower body section can be snap fit, friction fit, screwed on, or rotated with groove fit for different sized conventional bottles and containers, such that the cap assembly is a universal device for designed for many uses.

Figure 7:
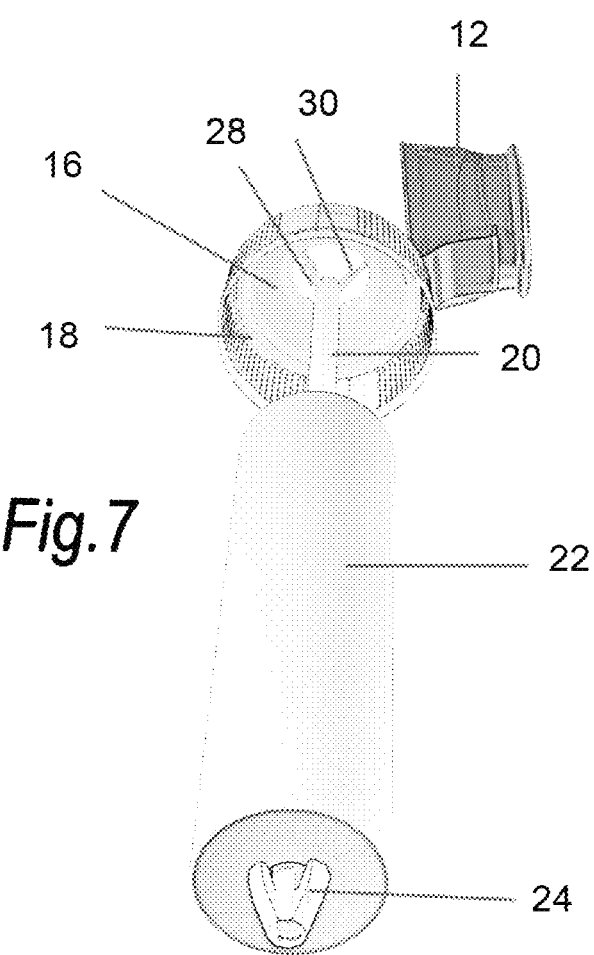
FIG. 7 is a perspective bottom view of the apparatus shown in FIG. 5.

FIG. 7 is a perspective bottom view of the cap assembly of the instant invention shown in FIG. 5, and upper body section 16 and structural components of FIG. 6.

Figure 8:
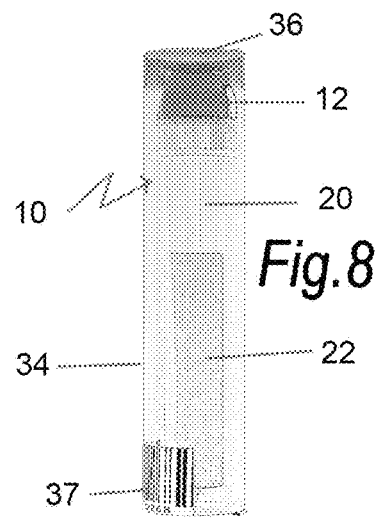
FIG. 8 is a side plan view of the instant invention in a configuration for delivery and sales.

FIG. 8 is a side plan view of cap assembly 10 in a configuration for packaging, delivery, marketing, and sales of the instant invention. The cap assembly is inserted within a complementary sleeve container 34 with top 36. Multiple units can be packaged together retail sales, manufacturing and shipments. Sleeve container 34 can be transparent, and also include a bar code 37 for scanning, or other marketing indicia.

Figure 9:
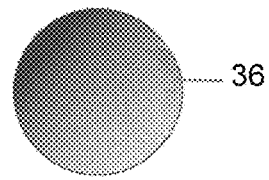
FIG. 9 is a top plan view of that shown in FIG. 8.

FIG. 9 is a top plan view of the packaged unit illustrated in FIG. 8.

Figure 10:
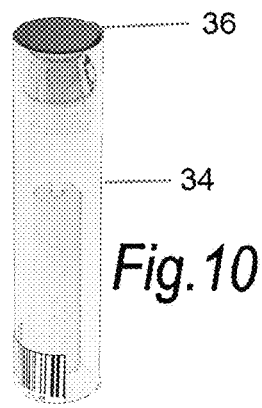
FIG. 10 is a perspective side view of that shown in FIG. 8.

FIG. 10 is a perspective side view of the packaged unit illustrated in FIG. 8.

Figure 11:
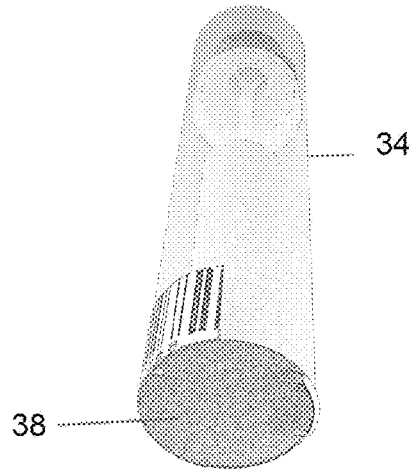
FIG. 11 is a perspective bottom view of that shown in FIG. 8.

FIG. 11 is a perspective bottom view of the packaged unit illustrated in FIG. 8

Figure 12:
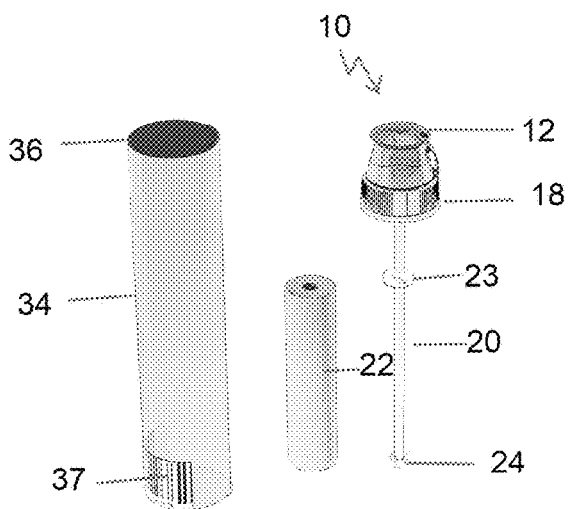
FIG. 12 is a perspective view of components of the apparatus shown in FIG. 8 prior to assembly.

FIG. 12 is a perspective view of the components of the cap assembly 10 shown in FIG. 3 and FIG. 8 prior to assembly. Substance 22 is not attached to stem 20 of the cap assembly, and the entire unit has not be inserted within packaging sleeve 34.

Figure 13:
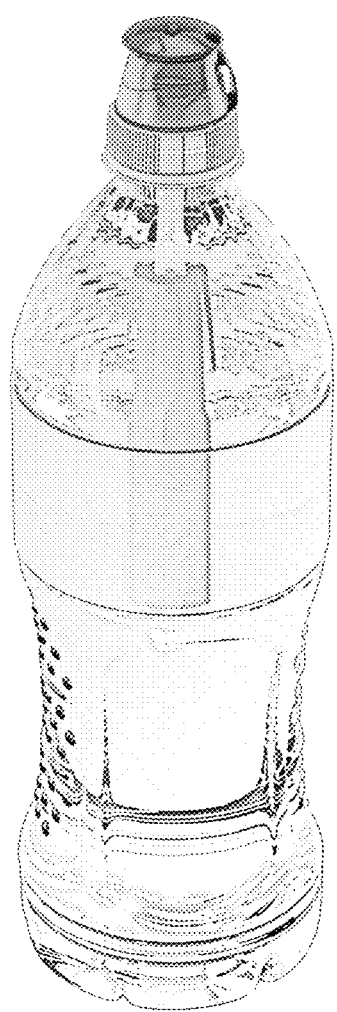
FIG. 13 is a perspective view of the cap assembly of the instant invention attached to a conventional water bottle.

FIG. 13 is a perspective view of improved cap assembly 10 with a soluble material attached, and inserted within a conventional water bottle.

The instant invention has been shown and described herein in what is considered to be the most practical and preferred embodiments. It is recognized, however, that departures may be made therefrom within the scope of the invention and that obvious modifications will occur to a person skilled in the art.

What is claimed is:

1. An improved cap assembly for a drinking bottle or container, said cap assembly for supporting a soluble material within said bottle or container, said cap assembly comprising:
    a cap body for drinking liquids;
    said cap body including an upper body section and a lower body section;
    said upper body section and said lower body section being discrete sections and integrally associated with one another;
    said upper body section having an open central section for fluid flow;
    a generally central stem, said stem having an upper end and a lower end, said stem being suspended from its upper end and secured within said upper body section;
    a plurality of radial members, said radial members being thin and elongated;
    said radial members protruding outwardly from said stem, and secured only at one end directly to said upper end of said stem and secured only at an opposite end directly to said upper body section about said open central section; and
    said stem for retaining and suspending said soluble material within said bottle or container.

2. The apparatus of claim 1, further comprising:
    a top;
    said top detachably secured to said cap body; and
    said top for closing said cap assembly to prevent the flow of liquid therefrom.

3. The apparatus of claim 1, further comprising:
    said upper body section having a central ring defining said open central section; and
    said radial members secured at said one end to said upper end of said stem, and secured at said opposite end to said central ring.

4. The apparatus of claim 3, further comprising:
    said stem including means for retaining said soluble material about said stem.

5. The apparatus of claim 4, further comprising:
    said stem having a lowermost end; and
    said means for retaining including a prong or barbs at said end.

6. The apparatus of claim 1, further comprising:
    said upper body section including means for drinking liquid from said bottle or container.

7. The apparatus of claim 1, further comprising:
    said lower body section including means for attaching said cap assembly to said bottle or container.

8. The apparatus of claim 1, wherein said upper body section comprises a material selected from the group consisting of rigid, semi-rigid, flexible or semi-flexible materials.

9. The apparatus of claim 1, wherein said lower body section comprises a material selected from the group consisting of rigid, semi-rigid, flexible or semi-flexible materials.

10. The apparatus of claim 7, further comprising:
    said lower body section being generally flexible and resilient to receive bottles or containers having necks of varying size.

11. The apparatus of claim 7, wherein said means for attaching comprises threads.

12. The apparatus of claim 7, wherein said means for attaching comprises grooves.

13. The apparatus of 10, wherein said means for attaching comprises a snap on friction fit.

14. The apparatus of claim 1, wherein said cap assembly is a unitary device; and said stem being integrally associated therewith.

15. An improved cap assembly for a drinking bottle or container, said cap assembly for supporting a soluble material within said bottle or container, said cap assembly comprising:
    a cap body for drinking liquids;
    said cap body including an upper body section and a lower body section;

said upper body section and said lower body section being discrete sections and integrally associated with one another;

said upper body section having an open central section for fluid flow;

a generally central stem, said stem having an upper end and a lower end, said stem being suspended from its upper end and secured within said upper body section;

said stem for retaining and suspending said soluble material within said bottle or container;

a plurality of radial members, said radial members being thin and elongated;

said radial members protruding outwardly from said stem, and secured only at one end directly to said upper end of said stem and secured only at an opposite end directly to said upper body section about said open central section; and said upper body section including a neck for drinking liquid from said bottle or container.

16. The apparatus of claim 15, further comprising:

said lower body section including means for attaching said cap assembly to said bottle or container.

17. The apparatus of claim 16, wherein said lower body section comprises a material selected from the group consisting of rigid, semi-rigid, flexible or semi-flexible materials.

\* \* \* \* \*